UNITED STATES PATENT OFFICE.

FRANK MARQUARD, OF NEW YORK, N. Y.

INSULATING COMPOSITION.

SPECIFICATION forming part of Letters Patent No. 407,896, dated July 30, 1889.

Application filed December 3, 1888. Serial No. 292,510. (No specimens.)

*To all whom it may concern:*

Be it known that I, FRANK MARQUARD, of the city, county, and State of New York, have invented a new and Improved Insulating Composition; and the following is declared to be a full, clear, and exact description of the same.

My improved composition is adapted for various uses in the arts, especially in connection with electric lighting and signaling apparatus, and may be made in the form of sheets, tubes, and other articles where a degree of elasticity is desirable.

My improved composition consists of wood pulp, extract of logwood, bichromate of potash, sulphate of iron, animal glue, rosewood sawdust, an albuminous substance, and vegetable fiber; and these ingredients I mix in about the following proportions: twenty pounds of wood pulp, one pound of extract of logwood, one-eighth of a pound of bichromate of potash, one-eighth of a pound of sulphate of iron, four pounds of animal glue, ten pounds of rosewood sawdust, two and one-half pounds of an albuminous substance—such as bullock's blood—and any desirable quantity of vegetable fiber, the quantity being determined by the use to which the articles made of the composition are to be put. These ingredients, in about the proportions named, are compounded as follows: The wood pulp, extract of logwood, bichromate of potash, sulphate of iron, and animal glue are thoroughly mixed together and steamed in any desirable vessel and then allowed to become cold. The rosewood sawdust, the albumen, and the vegetable fiber are mixed together, and this mixture is added to the former mixture after such former mixture becomes cold and said ingredients are thoroughly stirred, so that the mass is made homogeneous and plastic.

This composition while in the plastic state is molded or otherwise shaped or formed into the various articles it is desired to make. It is also rolled into sheets and forced or drawn into tubes, all of which articles are allowed to thoroughly dry, after which they are pressed in molds that are previously heated to about 300°, or, in other words, to a heat which might be termed "hissing hot" to finish and complete the composition article.

In my improved composition the bichromate of potash acts on the animal glue and on the albuminous substance to make the same insoluble, and the sulphate of iron acts on the logwood chemically to make the same black, the color permeating the whole mass, so that the composition is very dark and almost black, which color, for the purposes to which this composition is adapted, is very desirable, and the composition having been pressed in heated molds is very hard and is capable of taking on a high polish.

My improved composition is adapted for making articles for use in connection with electric lighting and signaling apparatus in many and various forms, and the same can also be made into sheets and tubes and into other articles in other arts—such as picture-frames, moldings, rosettes, ornaments for furniture, as well as for many other purposes, and because of the vegetable fiber in said composition the same possesses a degree of elasticity and it is possible to bend the same more or less without the risk of breaking.

I do not herein limit myself to the use of a vegetable fiber—such as flax, hemp, &c.— in my improved composition, as there may be conditions under which it is not necessary to employ the same for the purposes for which it is nominally intended.

I claim as my invention—

1. The insulating compound herein described, consisting of wood pulp, extract of logwood, bichromate of potash, sulphate of iron, animal glue, rosewood sawdust, an albuminous substance, and vegetable fiber, substantially as set forth.

2. The insulating compound herein described, the same consisting of the following ingredients, in about the following proportions: twenty pounds of wood pulp, one pound of extract of logwood, one-eighth of a pound of bichromate of potash, one-eighth of a pound of sulphate of iron, four pounds of animal glue, ten pounds of rosewood sawdust, and two and one-half pounds of an albuminous substance, substantially as specified.

3. The insulating compound herein described, the same consisting of the following ingredients, in about the following proportions: twenty pounds of wood pulp, one pound of extract of logwood, one-eighth of a pound of bichromate of potash, one-eighth of a pound of sulphate of iron, four pounds of animal glue, ten pounds of rosewood sawdust, and two and one-half pounds of an albuminous substance, and a quantity of vegetable fiber, such as flax, hemp, &c., substantially as specified.

Signed by me this 1st day of December, A. D. 1888.

FRANK MARQUARD.

Witnesses:
GEO. T. PINCKNEY,
HAROLD SERRELL.